US012800099B2

(12) United States Patent
Harrison et al.

(10) Patent No.: US 12,800,099 B2
(45) Date of Patent: Nov. 17, 2026

(54) LOAD SUSPENDING SYSTEMS FOR CAMERA OPERATION

(71) Applicant: BLKBRD LLC, Burbank, CA (US)

(72) Inventors: Brett Christopher Harrison, Victoria (AU); Christopher Kevin Herr, Burbank, CA (US)

(73) Assignee: BLKBRD LLC, Burbank, CA (US)

(*) Notice: Subject to any disclaimer, the term of this patent is extended or adjusted under 35 U.S.C. 154(b) by 146 days.

(21) Appl. No.: 19/060,765

(22) Filed: Feb. 23, 2025

(65) Prior Publication Data

US 2025/0271102 A1 Aug. 28, 2025

Related U.S. Application Data

(60) Provisional application No. 63/557,069, filed on Feb. 23, 2024.

(51) Int. Cl.
*F16M 13/04* (2006.01)
*F16M 11/04* (2006.01)
*G03B 17/56* (2021.01)

(52) U.S. Cl.
CPC .......... *F16M 13/04* (2013.01); *F16M 11/046* (2013.01); *G03B 17/561* (2013.01); *F16M 2200/027* (2013.01)

(58) Field of Classification Search
CPC ........................ F16M 13/04; G03B 17/56–566
See application file for complete search history.

(56) References Cited

U.S. PATENT DOCUMENTS

| | | | | |
|---|---|---|---|---|
| 5,360,196 A | | 11/1994 | Brown | |
| 6,481,108 B1 | * | 11/2002 | Helinski .............. | B25H 1/0028 30/296.1 |
| 9,513,536 B2 | | 12/2016 | Hellsten et al. | |
| 10,401,713 B2 | | 9/2019 | Teichman | |
| 10,710,232 B2 | * | 7/2020 | Krohne .................. | F16M 13/04 |
| 10,809,599 B2 | | 10/2020 | Teichman et al. | |
| 2016/0259228 A1 | | 9/2016 | Hellsten et al. | |
| 2018/0299751 A1 | | 10/2018 | Teichman | |
| 2019/0346747 A1 | | 11/2019 | Teichman | |

FOREIGN PATENT DOCUMENTS

| | | | | |
|---|---|---|---|---|
| FR | 2812068 A1 | * | 1/2002 | ......... F16M 11/2092 |
| WO | WO-9525926 A1 | * | 9/1995 | ........... F16M 11/046 |

* cited by examiner

*Primary Examiner* — Leon W Rhodes, Jr.
(74) *Attorney, Agent, or Firm* — Nolan Heimann LLP; Adam Diament

(57) ABSTRACT

The present disclosure provides a load suspending system for passively supporting a load. The system includes brackets, elongated tubes extending from the brackets. The system includes return rollers positioned at the brackets and the elongated tubes. The system includes an elastic member having a first end and a second end. The elastic member is drawn through the return rollers and the elongated tubes, and the second end is configured to suspend a load. The retention arms pivotably connect to the brackets. The retention arms are configured to lock in a position of the elastic member to maintain tension at the second end. The system stabilizes the load suspending at the second end during movements of a user, the movements including walking, running or jumping.

20 Claims, 13 Drawing Sheets

LOAD SUSPENDING SYSTEMS FOR CAMERA OPERATION

CROSS-REFERENCE TO RELATED APPLICATIONS

This application claims priority to U.S. Provisional Patent Application No. 63/557,069, titled "Load Suspending Systems for Camera Operation," filed Feb. 23, 2024, which is hereby incorporated by reference in its entirety.

FIELD OF INVENTION

The present invention relates to load suspending systems, and more particularly to a load suspending system for use in camera operation.

BACKGROUND

The field of camera operation is constantly improving to bring about better stabilization, better control, smoother movements, and so on. Camera control broadly falls into two categories: active and passive. Active control involves the use of actuators, such as motors, hydraulics, and the like. In active camera control i.e., when a camera's movements are actively controlled, a camera operator provides input to a system and the system reacts by providing an output that is related to the input.

Passive control systems are primarily designed to facilitate smooth movements without adding any power to the system. For example, fluid heads implement passive hydraulic systems to help camera operators create smooth camera movements. Traditional handwheel systems also take advantage of high mass handwheels and camera systems to create smooth camera movements resulting from high rotational inertia.

However, rotational movements are not the only movements that need to be smoothed out. Camera operators must often walk, run, or otherwise move their bodies to track movements of actors or other subjects of cinematography. To prevent up and down movements of the camera operator from jostling the camera in a way that may negatively affect filming, camera operators need a system that eliminates these unwanted movements or, at a minimum, smooths them out. Passive systems are often preferred solutions for these types of problems for their simplicity and low cost.

One such example is disclosed in a U.S. Pat. No. 10,809,599, entitled "Mounted camera suspension and stabilization systems" ("the '599 Patent"). The '599 Patent discloses a body mounted camera suspension/stabilizer, utilizing over the shoulder, dual isolated suspension systems via one tension line passing through the fulcrum point of a telescoping boom pole with lift force created by an independent line suspension to stabilize the camera load as well as provide an even lift force from the floor to several feet overhead of the operator in a single move without the need for counterweights. The apparatus provides for an even lift force throughout the vertical range of the camera load that also further dampens vibrations and operator body movements.

Although the above discussed disclosure is useful, it still has problems and presents incomplete solutions. For instance, the '599 Patent doesn't have the locking and unlocking of the elastic bands to adjust the length of the elastic cord. As a result, the camera operator has to constantly hold the camera. This device does allow a user to add tension by pulling on the elastic, but it is very difficult to release tension without using two hands, and the user needs to let go over the camera to accomplish this, or if done with one hand, it can be unsafe an difficult. Further, the '599 Patent does not permit the camera to be stable when the camera operator walks, runs, or otherwise moves his/her body to track movements of actors or other subjects of cinematography, although it does allow some stabilizing of the Z-axis.

Another reference, U.S. Patent Publication No. US20190346747A1, discloses a body mounted camera suspension/stabilizer, utilizing over the shoulder, dual isolated suspension systems via one tension line passing through the fulcrum point of a telescoping boom pole with lift force created by an independent line suspension to stabilize the camera load as well as provide an even lift force from the floor to several feet overhead of the operator in a single move without the need for counterweights. The apparatus provides for an even lift force throughout the vertical range of the camera load that also further dampens vibrations and operator body movements.

Still another reference, U.S. Pat. No. 10,401,713B2, discloses a body mounted camera suspension/stabilizer, utilizing over the shoulder, dual isolated suspension systems via one tension line passing through the fulcrum point of a telescoping boom pole with lift force created by an independent line suspension to stabilize the camera load as well as provide an even lift force from the floor to several feet overhead of the operator in a single move without the need for counterweights. The apparatus provides for an even lift force throughout the vertical range of the camera load that also further dampens vibrations and operator body movements.

Still another reference, U.S. Pat. No. 10,809,599B2 discloses a body mounted camera suspension/stabilizer, utilizing over the shoulder, dual isolated suspension systems via one tension line passing through the fulcrum point of a telescoping boom pole with lift force created by an independent line suspension to stabilize the camera load as well as provide an even lift force from the floor to several feet overhead of the operator in a single move without the need for counterweights. The apparatus provides for an even lift force throughout the vertical range of the camera load that also further dampens vibrations and operator body movements.

Still another reference, U.S. Pat. No. 9,513,536B2, discloses a device comprising a harness, an arm, and an extendable string. The arm may include a first portion being fixed in relation to the harness and a second portion for supporting of the string. The string may include a first portion and a second portion, the first portion of the string being arranged for fastening of an optical instrument. The device may include an adjustable counter force device, and the second portion of the string may be attached to the adjustable counter force device for providing a counter force on the string. The adjustable counter force device may include a spring, a lever arm, and a support. The counter force exerted by the counter force device on the string may be adjustable. This system notably does not offer any stabilization effects. It is only a load carrying device.

Still another reference, U.S. Pat. No. 5,360,196A, discloses a weight support apparatus especially adapted for operation as a portable device on a moving carrier which is capable of being hand-guided by an operator in substantially free-floating manner to also isolate the weight from unwanted lateral and vertical movement caused by the motion of the carrier. The apparatus comprises weight support means for connection to and adapted to support at least part of the weight, which means is further adapted for connection to the carrier, and including a pair of support sections interconnected by a hinge, wherein at least one of the support sections includes a series of pivotally interconnected links. The disclosed devices support the camera from below, which has positives and negatives. It has a rigid link between the operator and the camera, which may transmit vibrations from the operator to the camera.

Despite the technology currently available, there is still a growing need for a load suspending system that passively smooths vertical camera movements.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The embodiments are for a load suspending system for passively supporting a load.

Its primary goal is to provide a passive load suspending system that facilitates smooth vertical movement of cameras and other payloads, and has the ability to be mounted/attached to various platforms, vests, pipes, vehicles, etc.

It is an object of the present invention to provide a system that maintains tension in an elastic member or cable to stabilize suspended payloads during the movement of an operator.

It is another object of the present invention to a load suspending system that enables camera operators to move freely, including walking, running, or jumping, without causing disruptive camera motion in the Z axis (up and down)

The embodiments of the present invention aim to address the limitations of traditional camera suspension and stabilization systems.

According to an aspect of the present invention, a load suspending system designed to passively stabilize a camera or other payload is provided. The system includes brackets, elongated tubes extending from the brackets. The system includes return rollers positioned at the brackets and the elongated tubes. The system includes an elastic member having a first end and a second end. The elastic member is drawn through the return rollers and the elongated tubes, and the second end is configured to suspend a load. The retention arms pivotably connected to the brackets. The retention arms are configured to lock in position of the elastic member to maintain tension at the second end. The system connects to a harness-based support structure integrating a pole extending above and behind a camera operator. The system stabilizes the load suspending at the second end during movements of a user, the movements including walking, running or jumping. The harness or other support structure are platforms in which the present invention may be attached to.

In one aspect, the plurality of return rollers include a first return roller, a second return roller, a third return roller, a fourth return roller and a fifth return roller arranged to define an elastic member path. Here, the elongated tubes include at least two (dual) elongated tubes. The first return roller, second return roller, third return roller, and fourth return roller are positioned in the brackets. The elongated tubes are positioned to align with specific return rollers. The elastic member is drawn through the elongated tubes and the return rollers, creating a controlled elastic member path that reduces internal friction and enhances smooth movement.

In another aspect, the plurality of return rollers includes a first return roller, a second return roller, a third return roller, a fourth return roller, a fifth return roller, a sixth return roller, and a seventh return roller arranged to define an elastic member (cable) path. Here, the elongated tubes include at least four (quad) elongated tubes. Here elongated tubes are positioned to align with specific return rollers. The four (quad) elongated tubes offer twice the amount of elastic pre-load as compared to a dual tube design, giving the camera operator a larger neutral zone and boom range. The quad tube is recommended for "Easy Rig" users and speed rail mounting. The number of rollers can easily be configured by changing where the return rollers are connected. The operator can make a simple out and back, or double it, as one can do with the quad tube embodiments. There may also be devices configured as a six tube or eight tube (or more) versions. The modulation is a power aspect of the invention.

The retention arms include rollers and a cable locking member to lock in the position of the elastic member. The rollers com include a first roller, a second roller, and a third roller, The cable locking member positions between the second roller and the third roller. The elastic member goes over the first roller, underneath the second roller, passes through the cable locking member, and the third roller. The cable locking member includes a seesaw-like structure having teeth configured to constrict the movement of the elastic member. The retention arms are configured to transition from a disengaged position to an engaged position in response to the tension in the elastic member.

In another aspect, the system includes a plurality of clips. Each clip includes a claw member and a U-shaped member. The clip removably connects to the elongated tubes, and stores excess length of the elastic member. The mechanism is driven in proportional manner, as the tension of the system increases, the cable locking mechanism experiences increased shutting force that lifts the elastic up and into the locking clam. This is beneficial as the lever can lock varying thicknesses of elastics, which is important, as each elastic has a certain weight range that it performs best in, and cameras have a large variety of weights, from five points to over forty pounds.

The foregoing general description of the illustrative embodiments and the following detailed description thereof are merely exemplary aspects of the teachings of this invention and are not restrictive.

DETAILED DESCRIPTION

Figure 1:
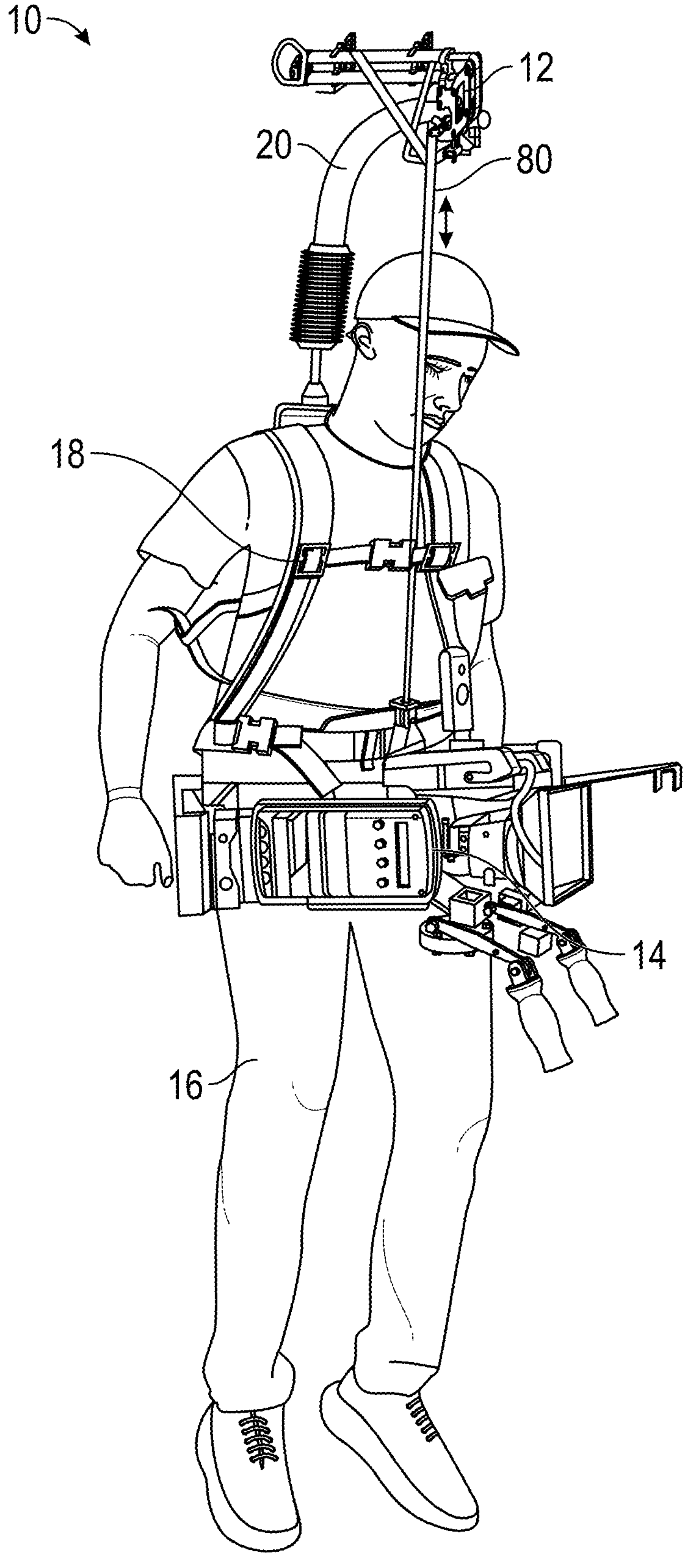
FIG. 1 illustrates an environment in which a load suspending system implements, in accordance with one exemplary embodiment of the present invention.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this invention will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein. All patents, patent applications and non-patent literature cited through this Specification are hereby incorporated by reference in their entireties. References cited in an Information Disclosure Statement should not be construed as an admission that the cited reference comes from an area that is analogous or directly applicable to the invention, but rather that the reference is being cited out of an abundance of caution.

Systems of inventive subject matter are designed to connect to a frame/bracket or other structure and to bear a suspended load. These systems can be useful in a variety of contexts, including in film and television, where the load borne by the system is a camera. Embodiments include an elastic member/cable, such as a length of rubber or rubber hose, that is elongated to affect its elastic characteristics.

Referring to Figures, FIG. 1 shows an environment 10 in which a load suspending system 12 implements, in accordance with one embodiment of the present invention. Load suspending system 12 will be referred to as a system 12 hereinafter. System 12 is used to suspend a camera or payload 14 at different heights for a camera operator or user 16. The presently disclosed invention is explained considering camera operator 16 operating camera 14 passively with support from system 12. However, a person skilled in the art understands that camera 14 may be replaced with any payload that is passively suspended for user 16 to operate/use/carry without departing from the scope of the present invention. Here, camera operator 16 puts on a vest or body harness 18. Vest 18 includes a pole or "rig" 20. Pole 20 includes an extension arm that rises above and behind camera operator 16 from vest 18 and includes a horizontal pole (booming arm) positioned in front of camera operator 16. Pole 20 connects to system 12 above the head of camera operator 16, as shown in FIG. 1.

Figure 2A:
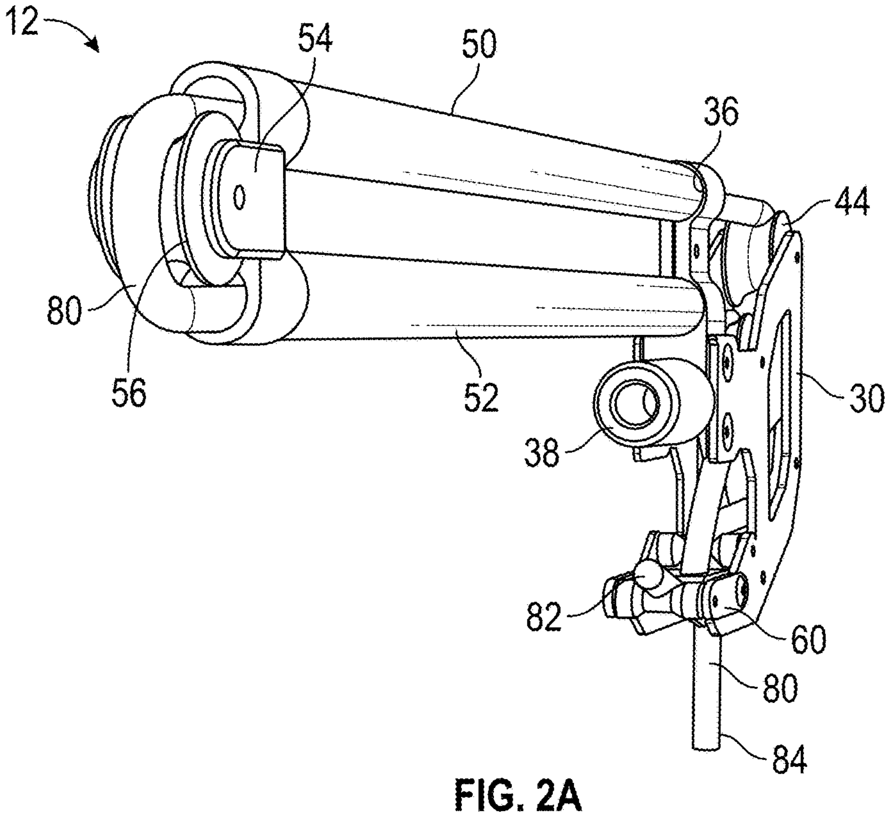
FIG. 2A and FIG. 2B illustrate a first side perspective view and a second side perspective view, respectively of the load suspending system, in accordance with one embodiment of the present invention.
Figure 2B:
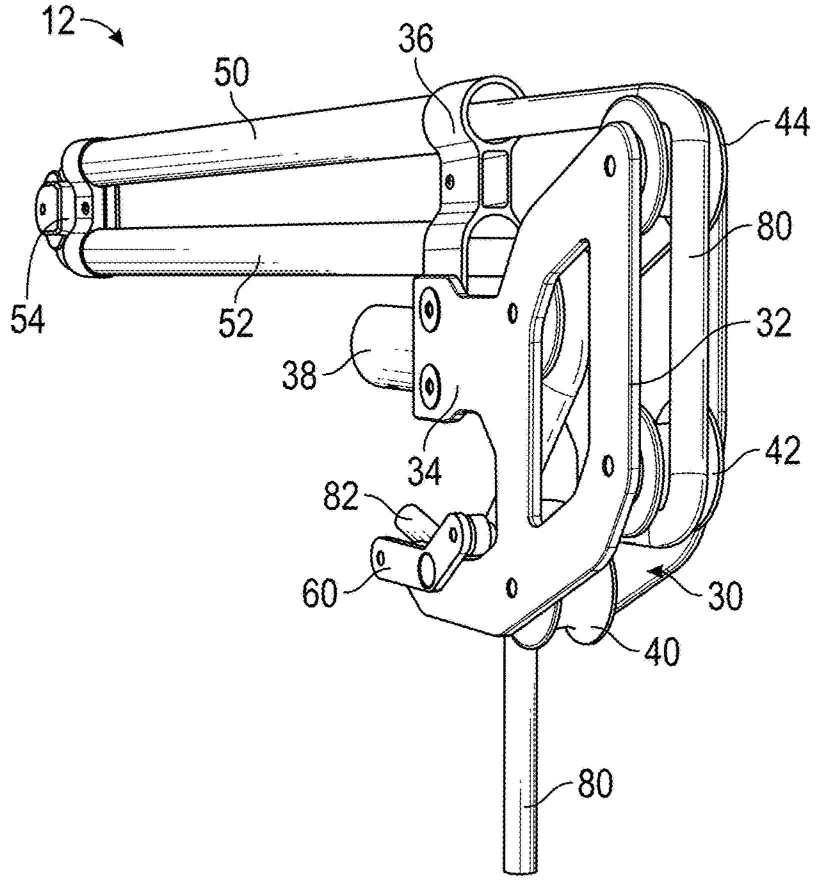

FIG. 2A and FIG. 2B show a first side perspective view and a second side perspective view, respectively of system 12, in accordance with one embodiment of the present invention. System 12 includes brackets or frames 30. Each bracket 30 includes a first bracket section 32 forming a C-shape, and a second bracket section 34 forming D-shape (with adjoining C-section) with first bracket section 32. Here, second bracket section 34 extends upwards at an angle from first bracket section 32. In one implementation, first bracket section 32 includes a first connector 36. First connector 36 encompasses a pole connector 38. As can be seen from FIG. 1, pole connector 38 extends from first bracket section 32 and receives pole 20.

Figure 3:
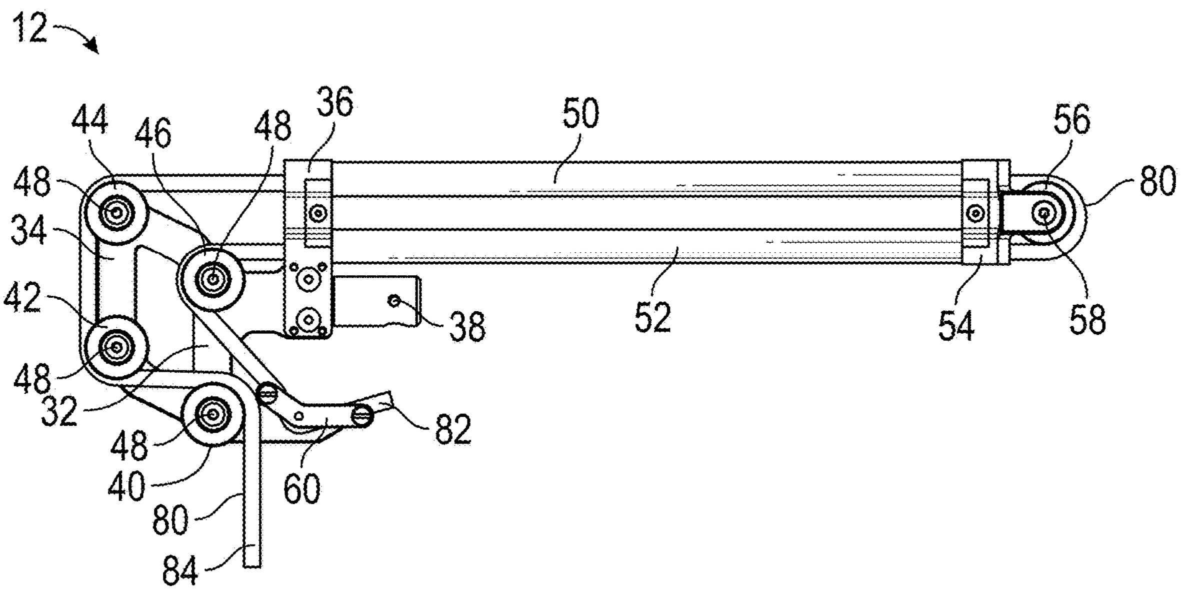
FIG. 3 illustrates a partially exposed view of the load suspending system, in accordance with one embodiment of the present invention.

Further, brackets 30 encompass a plurality of return rollers or return pulleys. In one example, the plurality of return rollers include a first return roller 40, a second return roller 42, a third return roller 44, and a fourth return roller 46. Each of first return roller 40, second return roller 42, third return roller 44, and fourth return roller 46 connects to bracket 30 via a first pin 48 at its center. FIG. 3 shows the features of first return roller 40, second return roller 42, third return roller 44, and fourth return roller 46 having first pin 48. Here, one bracket 30 is removed to showcase first pin 48 positioned within brackets 30 shown in FIG. 2A and FIG. 2B. As can be seen from FIG. 3, first return roller 40 positions at the bottom and align with fourth return roller 46. Second return roller 42 positions left of first return roller 40 such that the top of first return roller 40 aligns with bottom of second return roller 42. Further, third return roller 44 positions above and aligns with second return roller 42. Return rollers may be used to add tension by mounting the rear (or more) rollers to either a lead screw or other means of separation. Rather than pulling one of the elastic through the system.

Furthermore, system 12 includes a plurality of elongated tubes. In the present embodiment, the plurality of elongated tubes include a first elongated tube 50 and a second elongated tube 52. Each of first elongated tube 50 and second elongated tube 52 is drawn through first connector 36 at one end and connects to a second connector 54 the other end. As can be seen from at least FIG. 2A, second connector 54 encompasses a fifth return roller 56. In one example, fifth return roller 56 connects to second connector 54 via a second pin 58. Here, first elongated tube 50 is positioned to align with third return roller 44, and second elongated tube 52 is positioned to align with fourth return roller 46, as can be seen from at least FIG. 3.

Figure 4:
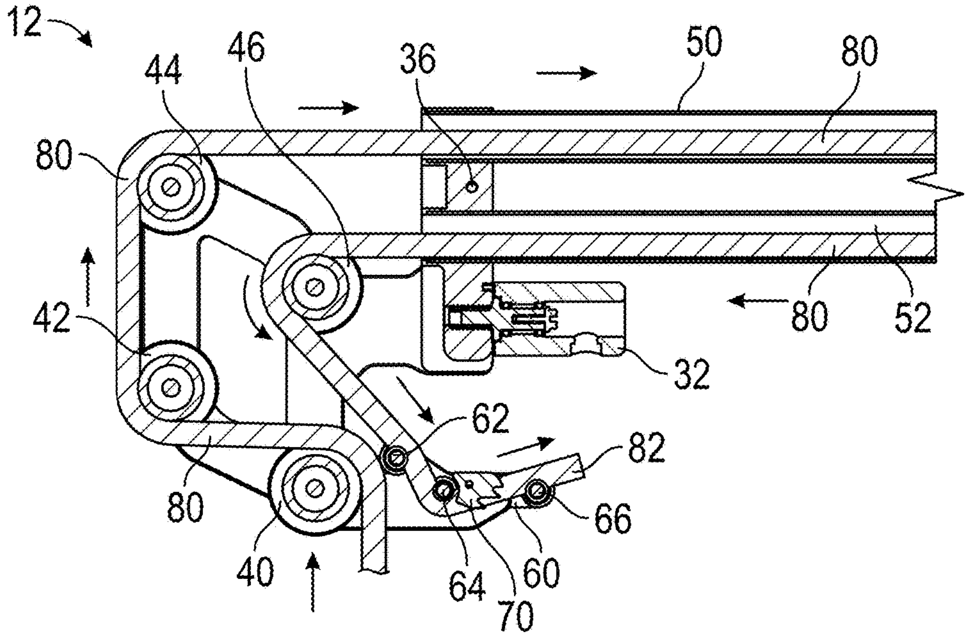
FIG. 4 illustrates a partial cross-sectional view of the load suspending system, in accordance with one embodiment of the present invention.
Figure 5:
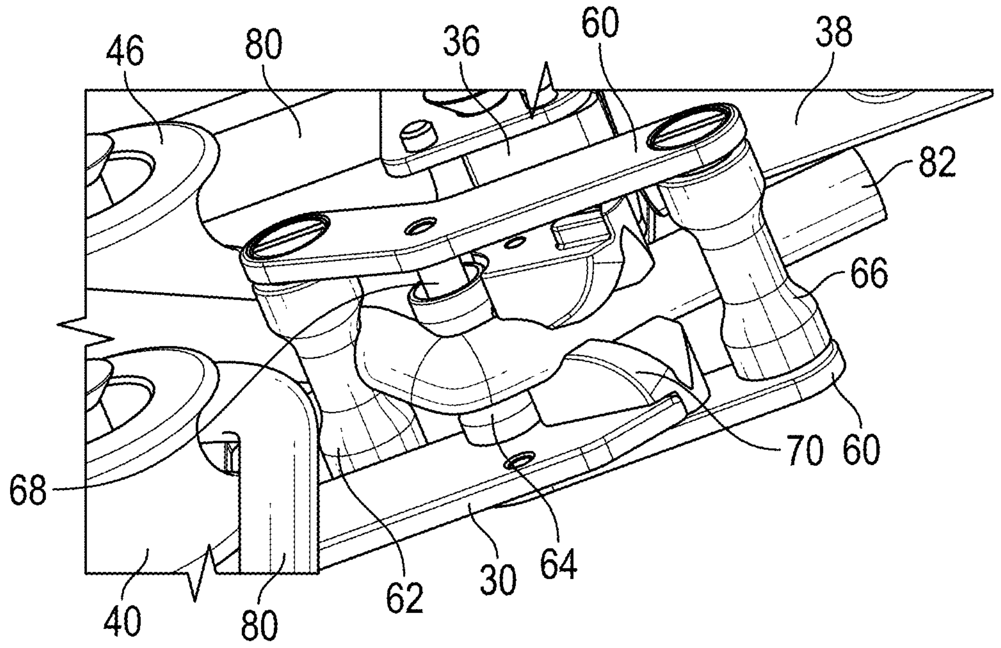
FIG. 5 and FIG. 7 illustrate enlarged perspective views of retention arms, in accordance with one embodiment of the present invention.

Now referring to FIG. 4, a partial cross-sectional view of system 12 is shown, in accordance with one embodiment of the present invention. At the bottom, brackets 30 present retention arms 60. Retention arms 60 position at both sides of brackets 30, as can be seen from at least FIG. 2B. Here, retention arms 60 pivotably connect to brackets 30. In one example, each retention arm 60 is angled at about 15-25 degrees. Retention arms 60 are configured to operate between an engaged position and a disengaged position. In one implementation, retention arms 60 include three rollers i.e., a first roller 62, a second roller 64, and a third roller 66, each connected via bearings 68. FIG. 5 shows an enlarged perspective view of retention arms 60 encompassing first roller 62, second roller 64, and third roller 66 connected via bearings 68. As can be seen, first roller 62 positions at distal ends of retention arms 60 and position in proximity to first return roller 40. Third roller 66 positions the other end of retention arms 60. Second roller 64 positions in between first roller 62 and third roller 66. In one example, second roller 64 positions closer to first roller 62 allowing sufficient space to place a cable locking member 70 in between second roller 64 and third roller 66.

Figure 6:
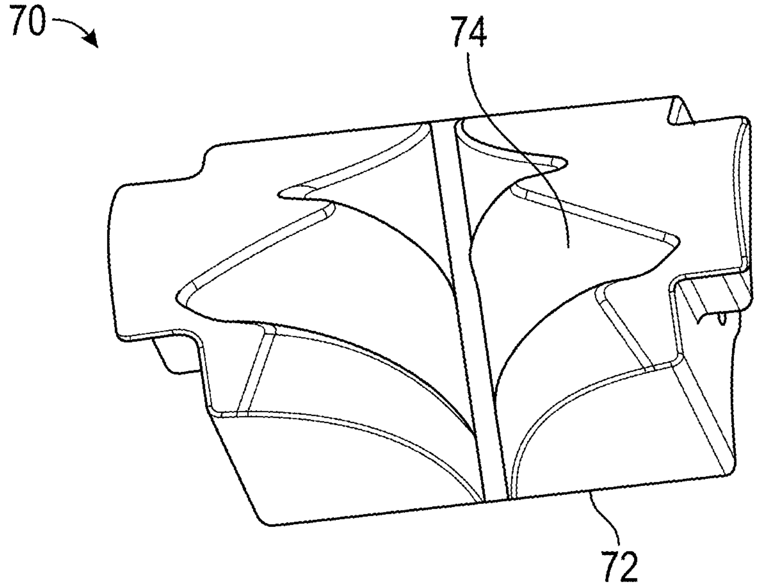
FIG. 6 illustrates a perspective view of a cable locking member, in accordance with one embodiment of the present invention.
Figure 7:
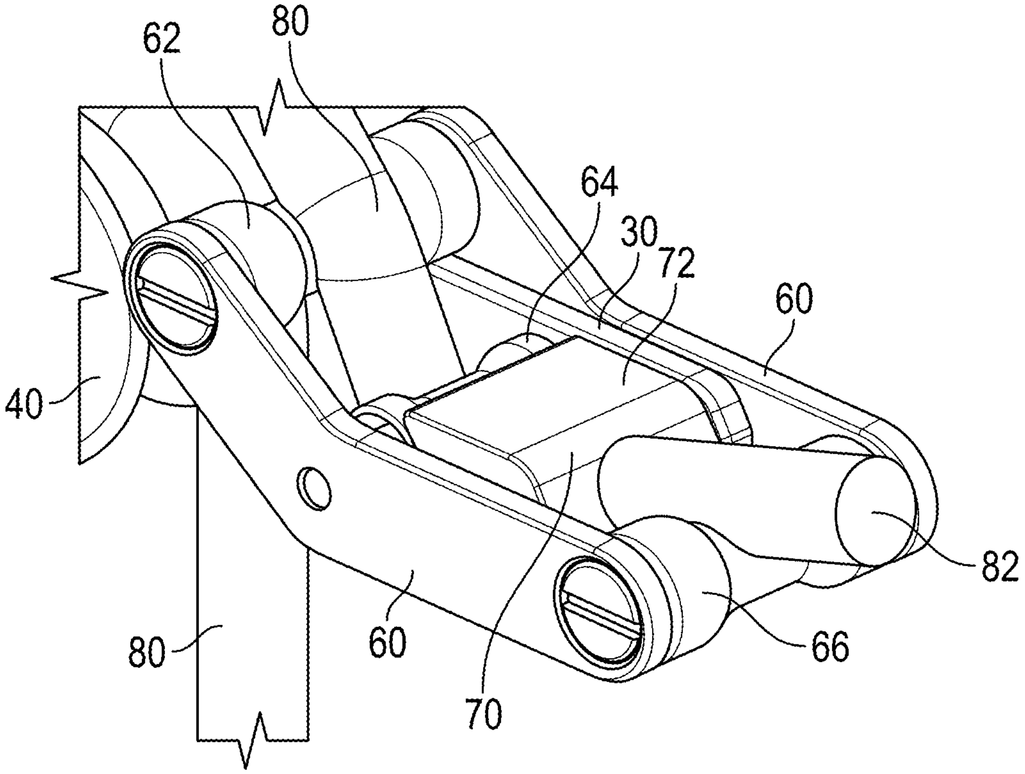

FIG. 6 shows a perspective view of cable locking member 70, in accordance with one embodiment of the present invention. Cable locking member 70 acts as a clamp for locking or unlocking cable 80 within retention arms 60. In some implementations, cable locking member 70 is injection molded. Cable locking member 70 includes a flat surface 72, and a seesaw-like structure 74 at the opposite of flat surface 72. Here, seesaw-like structure 74 is made to position facing down such that flat surface 72 faces pole connector 38, as can be seen from FIG. 4. Further, FIG. 7 shows an enlarged perspective view of cable locking member 70. Seesaw-like structure 74 has teeth that constrict down in two-axes to lock in cable or elastic member 80.

In the present embodiment, system 12 includes a cable or elastic member 80. Cable 80 indicates an elastic tension rope or resistance band or stretchy rope. Cable 80 may be filled with a fluid and includes a hollow inner diameter. This helps cable 80 to stick to itself and enables it to move freely over return rollers, rollers and within elongated tubes (without sticking), and reduces the internal friction. Cable 80 presents a cable first end 82 and a cable second end 84. Here, cable first end 82 of cable 80 is used to anchor or lock via cable locking member 70 to create tension at cable second end 84, where camera or payload or load 14 is suspended. Another method of adding tension, instead of pulling on one end of the elastic and essentially removing useful elastic from the system to achieve the desired tension is the use of return rollers, which do not change how much elastic is in the system, rather, how long the path is that the elastic must take. This has benefits in not having to carry around or store excess elastic, not needing as long of elastics, and allowing for additional embodiments of the device to have the tensioning mechanism on the back of the operator where it's more challenging to reach. The tensioning could be done via a separate mechanism on the hip of the operator that actuates the return rollers to move apart therefore increasing the path that the elastic must take and therefor adding tension to the system which raises the camera up away from the ground.

Now referring to FIG. 3, FIG. 4, FIG. 5 and FIG. 7, drawing of cable 80 through system 12 and locking cable first end 82 at cable locking member 70 is explained. At first, cable first end 82 is drawn into brackets 30. Here, cable first end 82 is drawn over and right of first return roller 40. Subsequently, cable first end 82 is drawn from bottom left of second return roller 42. Further, cable first end 82 is drawn up and over third return roller 44. At this point, cable first end 82 is drawn through first elongated tube 50. After existing from first elongated tube 50, cable first end 82 is positioned over fifth return roller 56 (FIG. 3) and drawn through second elongated tube 52 thereby returning cable 80 back to brackets 30. As presented above, second elongated tube 52 is positioned to align with fourth return roller 46. As such, cable first end 82 is made to go over fourth return roller 46. Here, cable first end 82 is drawn down at an angle i.e., straight/vertical angle (slanted position) such that cable first end 82 is made to go over interfacing first roller 62, underneath second roller 64, pass through seesaw-like structure 74 of cable locking member 70, and go over third roller 66, as shown in FIG. 5 and FIG. 7.

Subsequently, camera operator 16 pulls out sufficient length of cable first end 82 (of cable 80) depending on the need. In some implementations, camera operator 16 holds cable first end 82 with his/her one hand. Cable second end 84 is used to connect to a load such as camera 14, as can be seen from FIG. 1. After connecting camera 14, camera operator 16 pulls down retention arms 60 to a disengaged position such that he/she will be able to pull cable first end 82, which in turn pulls up cable second end 84 and thereby camera 14. When retention arms 60 are pulled down, cable first end 82 is prevented from engaging with seesaw-like structure 74 thereby allowing it to move freely. During the disengaged position, cable 80 from fourth return roller 46 to first roller 62 has a straight/vertical angle (slanted position) allowing cable 80 to be easily pulled or released while holding cable first end 82. Here, camera operator 16 can adjust the length of cable first end 82 freely by pulling or releasing cable 80 while positioning it in straight/vertical angle (slanted position) from fourth return roller 46 to first roller 62.

After achieving desired length, the tension at cable 80 pushes up retention arms 60 such that it turns from the disengaged position to the engaged position as soon as camera operator 16 releases cable 80. Here, seesaw-like structure 74 together with first roller 62, second roller 64, and third roller 66 create a bend lock and prevent cable first end 82 from moving. In other words, retention arms 60 along with first roller 62, second roller 64, and third roller 66 create a see-saw effect rocking upward as cable 80 is released from cable first end 82, which then jams cable 80 into the clam cleat (cable locking member 70), which is shaped in a curved manner (seesaw-like structure 74) to better respond to the varying diameter and deformation of the rubber elastic cable 80. Here, the straight angle (slanted position) of cable 80 from fourth return roller 46 to first roller 62 is constrained or offset by first roller 62 and prevents it from being pulled further. In other words, first roller 62 is driven by the tension in cable 80 that is spanned between first roller 62 and third roller 66, and then first roller 62 pushes retention arms 60 into the engaged (locking) position. The elasticity in cable 80 tries to form a straight line and pushes the retention arms 60 to its engaged (locking) position. The tighter camera operator 16 tries to pull down, the tighter retention arms 60 tries to lock the position of cable 80.

As cable first end 82 is locked, the tension remaining at cable 80 (via five rollers that serve to facilitate elongation of cable 80) especially at cable second end 84 enables the suspended camera 14 to move up and down even without being held by camera operator 16 via brackets 30. Here, brackets 30 are used to add and reduce tension and direct cable 80 downward to connect camera 14. This way, camera 14 remains stable when camera operator 16 moves or even jumps or walks or runs. In some implementations, camera operator 16 may hold camera 14 to control the direction it has to face to capture video while system 12 takes care of camera 14 being held in a stable position via system 12 and pole 20.

Figure 8:
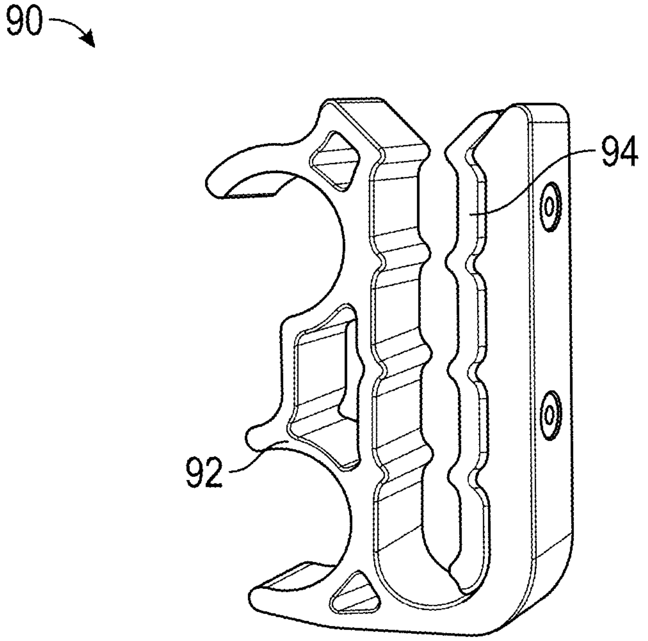
FIG. 8 illustrates a perspective view of a clip, in accordance with one embodiment of the present invention.
Figure 9:
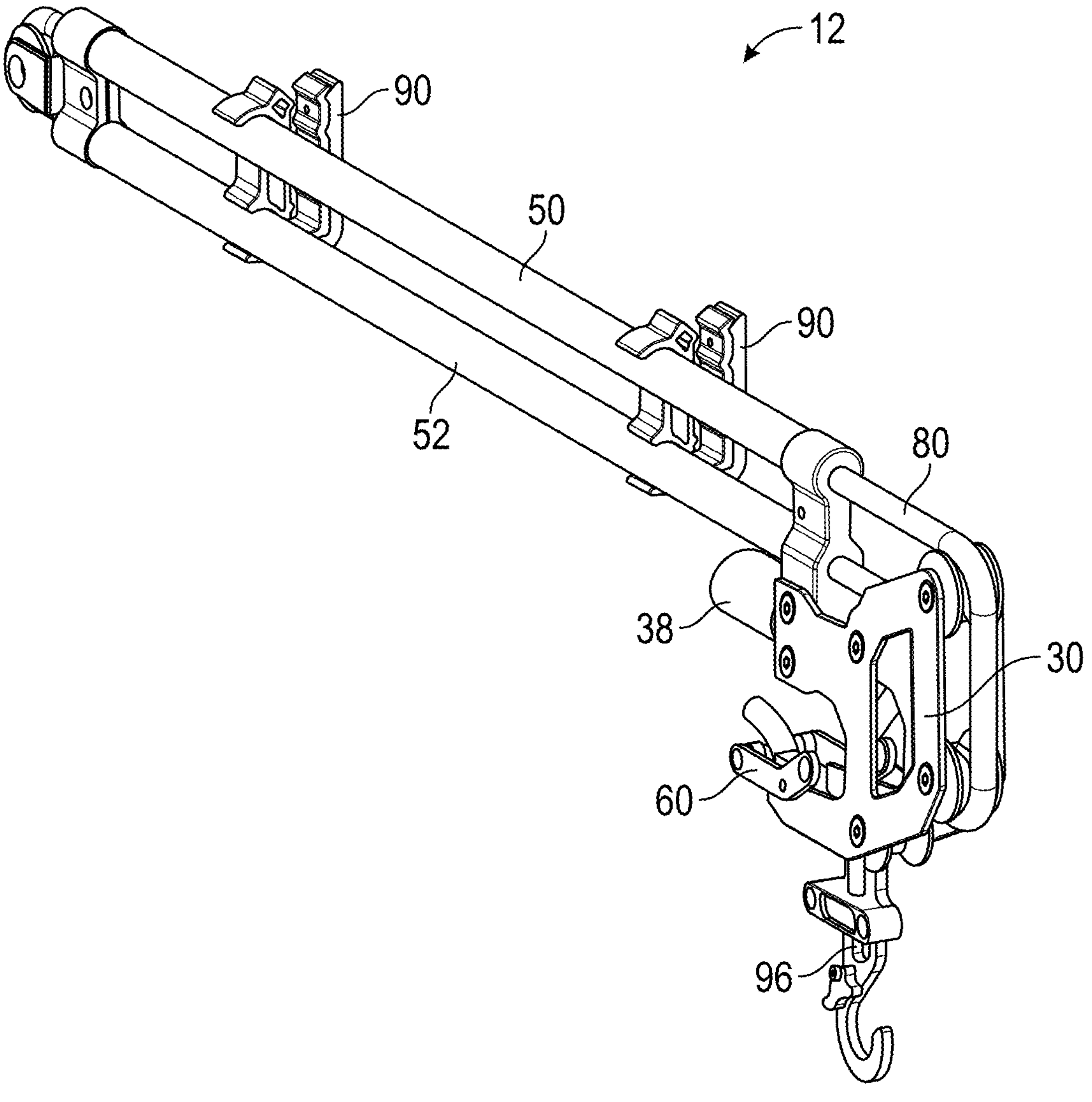
FIG. 9 illustrates the clip connected to the load suspending system, in accordance with one embodiment of the present invention.

In one embodiment, system 12 includes a plurality of clips 90. FIG. 8 shows a perspective view of a clip 90, in accordance with one embodiment of the present invention. Clip 90 is injection molded and comes in different sizes. Clip 90 includes a claw member 92, and a U-shaped member 94 extending from claw member 92. Claw member 92 is shaped similar to the outer shape of elongated tubes 50, 52. This way, claw member 92 is used to lock to elongated tubes 50, 52. FIG. 9 shows an exemplary embodiment in which clips 90 connect to system 12. After connecting claw member 92 to elongated tubes 50, 52, U-shaped member 94 is used to place excess length of cable first end 82 such that cable first end 82 doesn't come in the way of camera operator 16 during the use. The feature of storing excess length of cable 80 is explained in the later part of the description using FIG. 20. In some implementations, system 12 includes a hook member 96 with a magnetic lock used for connecting camera 14.

Figure 10:
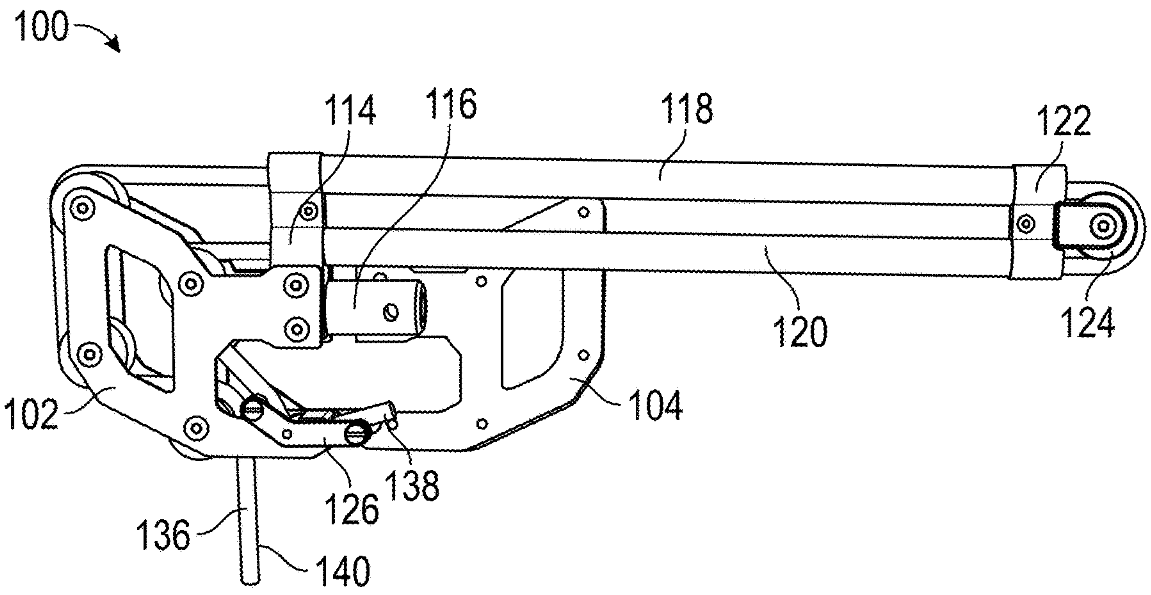
FIG. 10, FIG. 11 and FIG. 12 illustrate a front view, a cross-sectional view, and an exploded view, respectively of a load suspending system, in accordance with another embodiment of the present invention.
Figure 11:
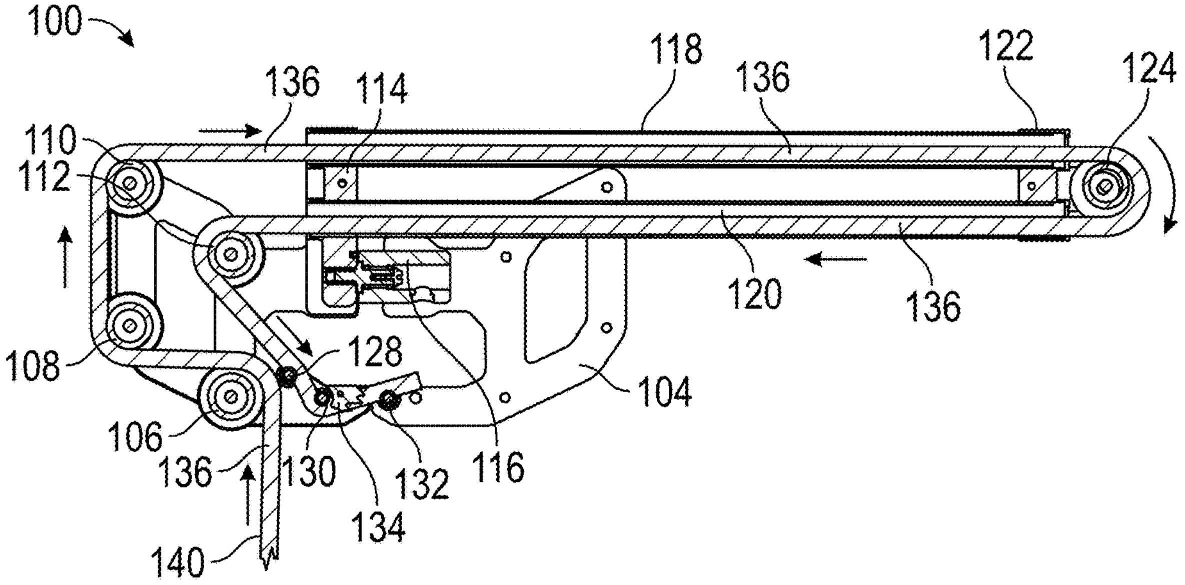
Figure 12:
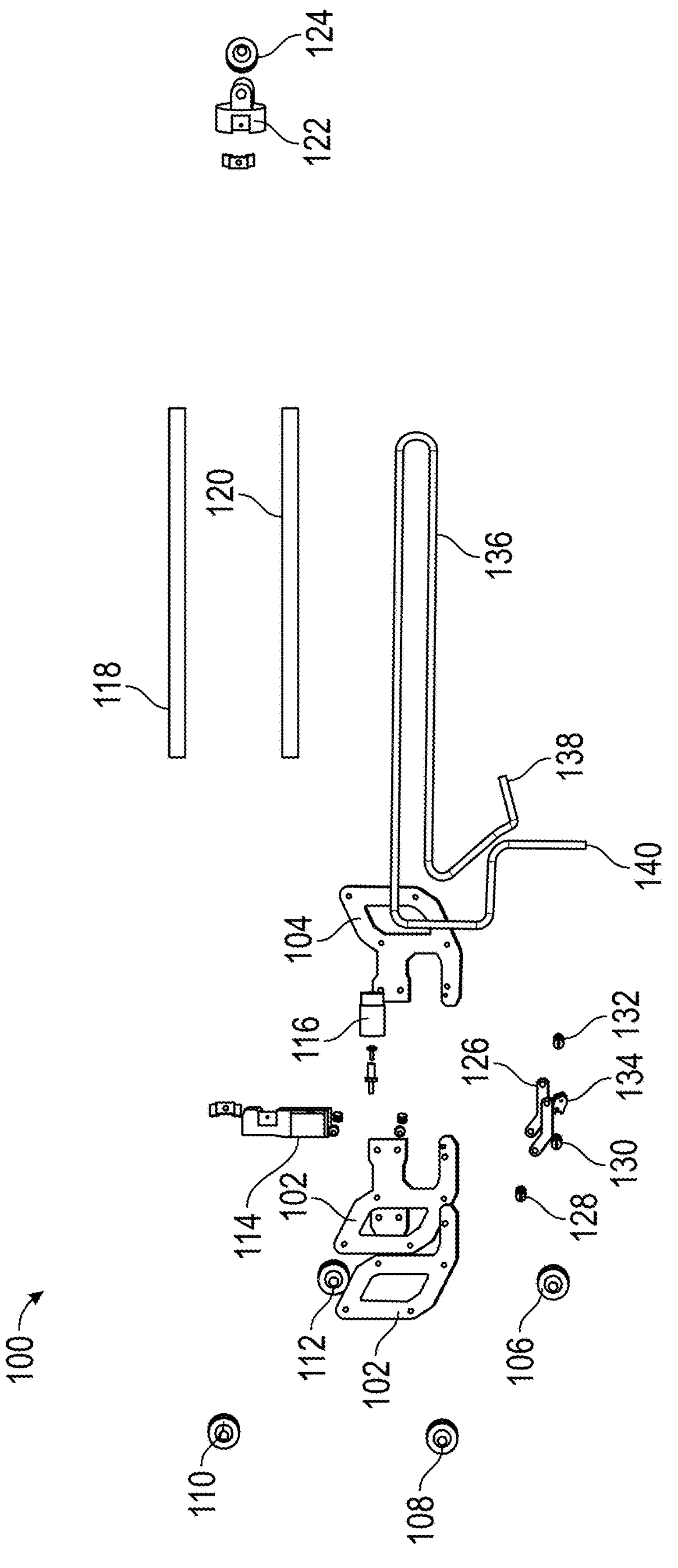

Now referring to FIG. 10, FIG. 11 and FIG. 12, a front view, a cross-sectional view, and an exploded view, respectively of a load suspending system 100 or simply system 100 is shown, in accordance with one embodiment of the present invention. System 100 includes brackets 102 and an auxiliary bracket 104. Brackets 102 include all components and operate similar to that of brackets 30, explained above. Auxiliary bracket 104 indicates an additional bracket that allows camera operator 16 to hold and operate system 100. Here, auxiliary bracket 104 may removably connect to brackets 102 allowing camera operator 16 to use it when needed. The auxiliary bracket 104 placement in FIG. 10 and FIG. 11 for viewing purposes only, but in operation and assembled, the auxiliary bracket 104 and brackets 102 sandwich the internal components (such as the return roller (s) 108 of the load suspending system 100.

Brackets 102 encompasses a first return roller 106, a second return roller 108, a third return roller 110, and a fourth return roller 112. As can be seen, first return roller 106 positions at the bottom and aligns with fourth return roller 112. Second return roller 108 positions left of first return roller 106 such that the top of first return roller 106 aligns with bottom of second return roller 108. Further, third return roller 110 positions above and aligns with second return roller 108. System 100 presents a first connector 114 extending from brackets 102. First connector 114 facilitates in connecting a pole connector 116. Pole connector 116 extends from brackets 102.

System 100 includes a first elongated tube 118 and a second elongated tube 120. Each of first elongated tube 118 and second elongated tube 120 is drawn through first connector 114 at one end and connected to a second connector 122 the other end. Second connector 122 encompasses a fifth return roller 124. Here, first elongated tube 118 is positioned to align with third return roller 110, and second elongated tube 120 is positioned to align with fourth return roller 112, as can be seen from at least FIG. 11.

At the bottom, brackets 102 present retention arms 126. Retention arms 126 position at both sides of brackets 102 and include three rollers i.e., a first roller 128, a second roller 130, and a third roller 132. Here, retention arms 126 pivotably connect to brackets 102. In one example, each retention arm 126 is angled at about 15-25 degrees. Retention arms 126 are configured to operate between an engaged position and a disengaged position. As can be seen from at least FIG. 11, first roller 128 positions at distal ends of retention arms 126 and positions in proximity to first return roller 106. Third roller 132 positions the other end of retention arms 126. Second roller 130 positions in between first roller 128 and third roller 132. In one example, second roller 130 positions closer to first roller 128 allowing sufficient space to place a cable locking member 134 between second roller 130 and third roller 132. Cable locking member 134 includes all features and operates similar to cable locking member 70 explained above.

Further, system 100 includes a cable 136. Cable 136 indicates an elastic tension rope or resistance band or stretchy rope. Cable 136 may be filled with a fluid and includes a hollow inner diameter. This prevents the cable 136 from sticking to itself internally. As the inside diameter is compressed, it tends to stick to itself and create and audible popping noise as it comes back into shape as it transits from one roller to another. This popping noise is not acceptable in a film environment where sound is being recorded, and enables it to move freely over return rollers, elongated tubes and rollers, and reduces the internal friction. Cable 136 presents a cable first end 138 and a cable second end 140.

In the present embodiment, cable first end 138 is drawn into brackets 102. Here, cable first end 138 is drawn over and right of first return roller 106. Subsequently, cable first end 138 is drawn from bottom left of second return roller 108. Further, cable first end 138 is drawn up and over third return roller 110. At this point, cable first end 138 is drawn through first elongated tube 118. After existing from first elongated tube 118, cable first end 138 is positioned over fifth return roller 124 and drawn through second elongated tube 120 thereby returning cable 136 back to brackets 102. As presented above, second elongated tube 120 is positioned to align with fourth return roller 112. As such, cable first end 138 is made to go over fourth return roller 112. Here, cable first end 138 is drawn down at an angle (straight/vertical angle (slanted position)) such that cable first end 138 is made to go over interfacing first roller 128, underneath second roller 130, pass through cable locking member 134, and over third roller 132, as shown in FIG. 11.

Camera operator 16 pulls out sufficient length of cable first end 138 and releases cable 136 such that retention arms 126 together with rollers 128, 130, 132 create a bend lock and prevent cable first end 138 from moving. As cable first end 138 is locked, the tension remaining at cable 136 enables the suspended camera to move up and down even without being held by camera operator 16. This way, camera 14 remains stable when camera operator 16 moves or even jumps or walks or runs. In some implementations, camera operator 16 may hold camera 14 to control the direction it has to face to capture video while system 100 takes care of camera 14 being held in a stable position via the pole and system 100.

Figure 13:
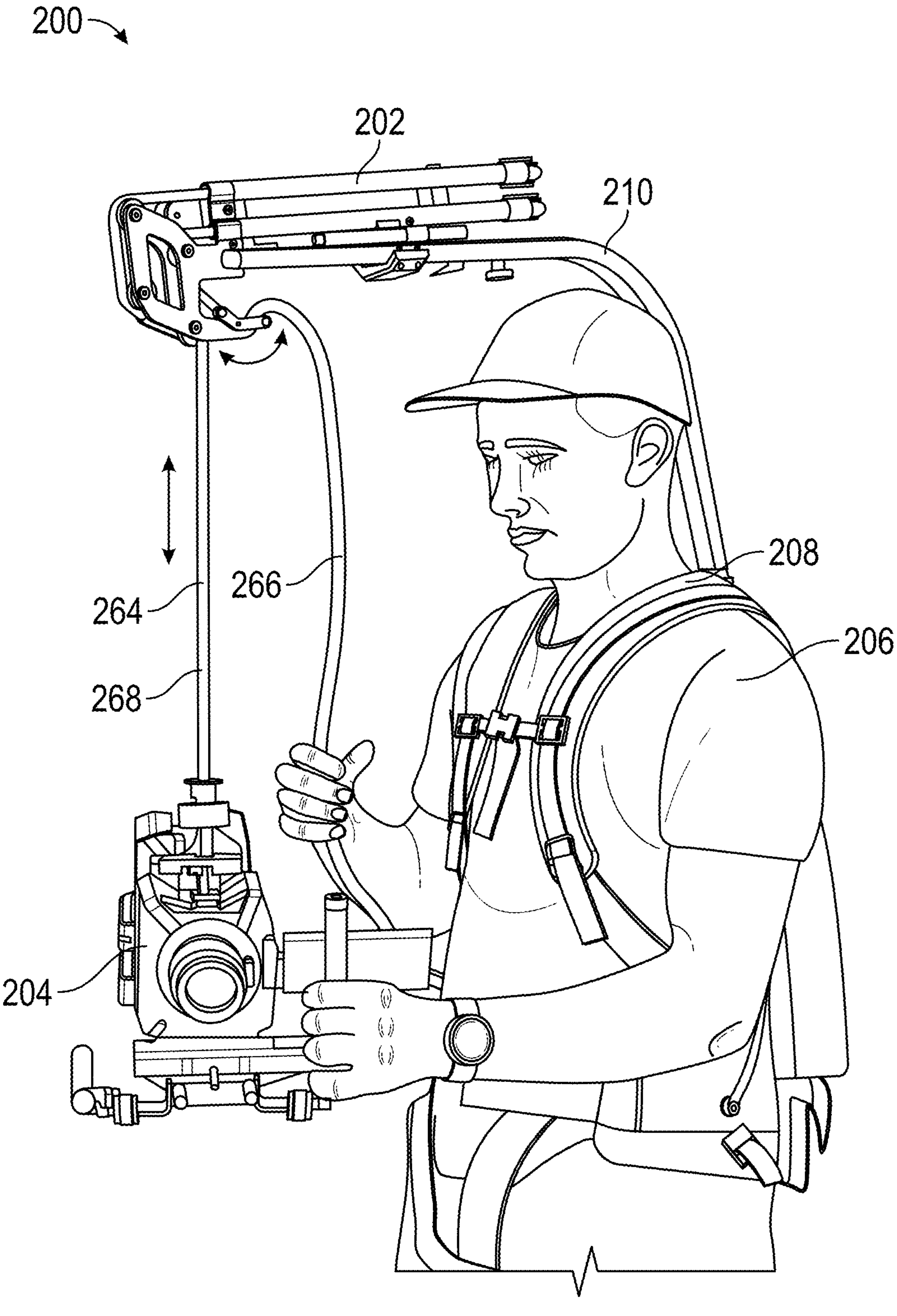
FIG. 13 illustrates an environment in which a load suspending system implements, in accordance with yet another embodiment of the present invention.

Now referring to FIG. 13, an environment 200 in which a load suspending system 202 implements, in accordance with one embodiment of the present invention. Load suspending system 202 will be referred to as system 202 hereinafter. System 202 is used to suspend a camera or load or payload 204 at different heights for a camera operator or user 206. Here, camera operator 206 puts on a vest or body harness 208. Vest 208 includes a pole or “rig” 210, as explained above.

Figure 14:
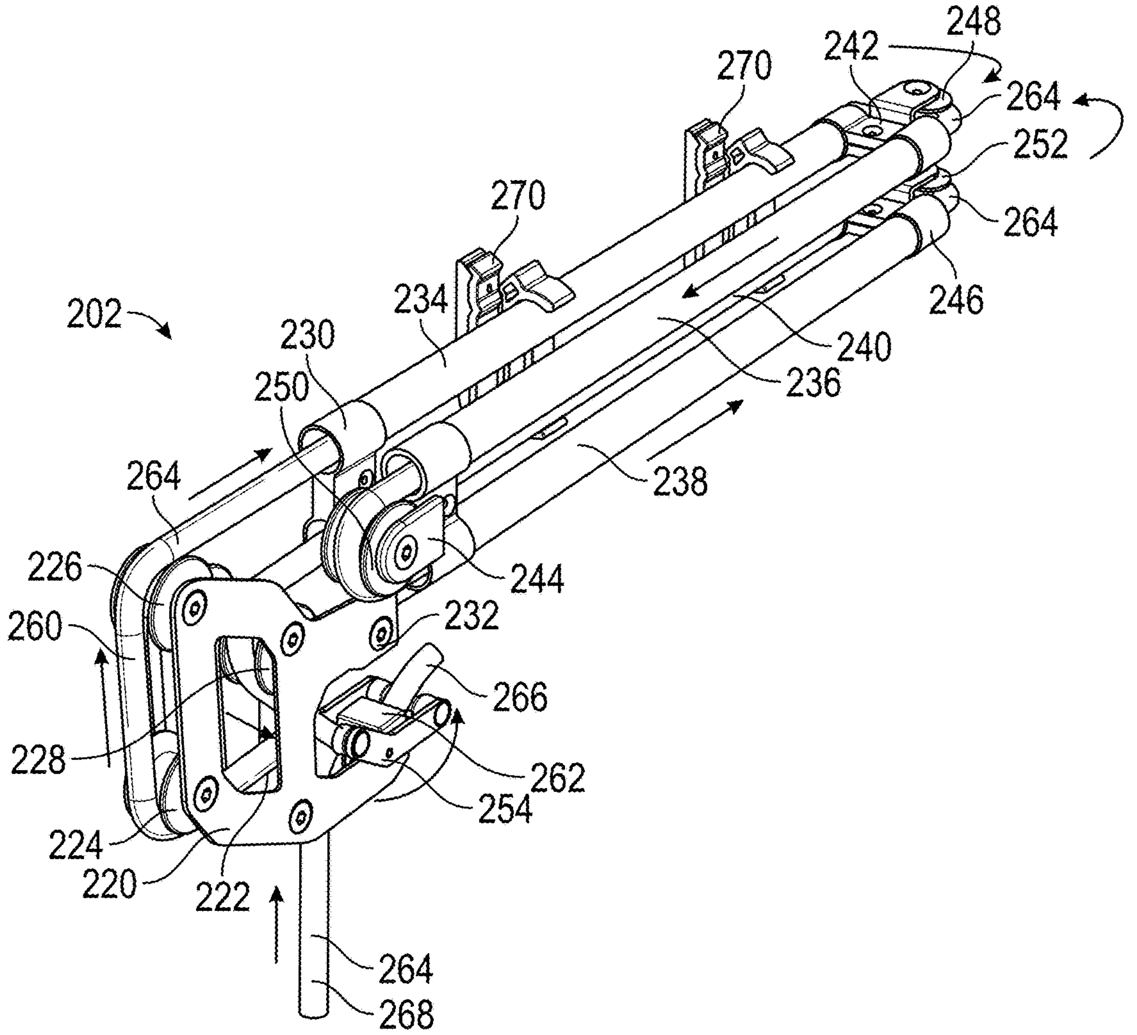
FIG. 14 illustrates a side perspective view of the load suspending system, in accordance with one embodiment of the present invention.

FIG. 14 shows a perspective view of system 202, in accordance with one embodiment of the present invention. System 202 includes brackets 220, similar to brackets 30, explained above. Further, brackets 220 encompasses a plurality of return rollers. In one example, the plurality of return rollers include a first return roller 222, a second return roller 224, a third return roller 226, and a fourth return roller 228. As presented above, first return roller 222 positions at the bottom and aligns with fourth return roller 228. Second return roller 224 positions left of first return roller 222 such that the top of first return roller 222 aligns with bottom of second return roller 224. Further, third return roller 226 positions above and aligns with second return roller 224.

In one implementation, system 202 includes a first connector 230 extending from brackets 220. First connector 230 encompasses a pole connector 232. Further, system 202 includes a plurality of elongated tubes. In the present embodiment, the plurality of elongated tubes include a first elongated tube 234, a second elongated tube 236, a third elongated tube 238, and a fourth elongated tube 240. First elongated tube 234 positions above fourth elongated tube 240 and adjacent to second elongated tube 236. Further, third elongated tube 238 positions below second elongated tube 236 and adjacent to fourth elongated tube 240. In one example, first elongated tube 234 connects to first connector 230 at one end and connects to a second connector 242 the other end. Second elongated tube 236 connects to second connector 242 at one end and connects to a third connector 244 the other end. Third elongated tube 238 connects to a third connector 244 at one end and connects to a fourth connector 246 the other end. Fourth elongated tube 240 connects to fourth connector 246 at one end and connects to first connector 230 the other end.

Figure 15:
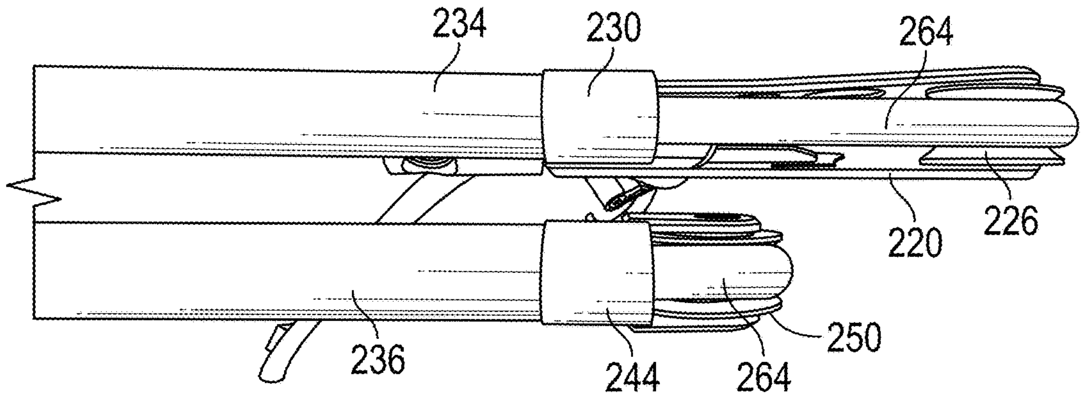
FIG. 15 and FIG. 16 illustrate a partial top view and a partial end view, respectively of the load suspending system, in accordance with one embodiment of the present invention.
Figure 16:
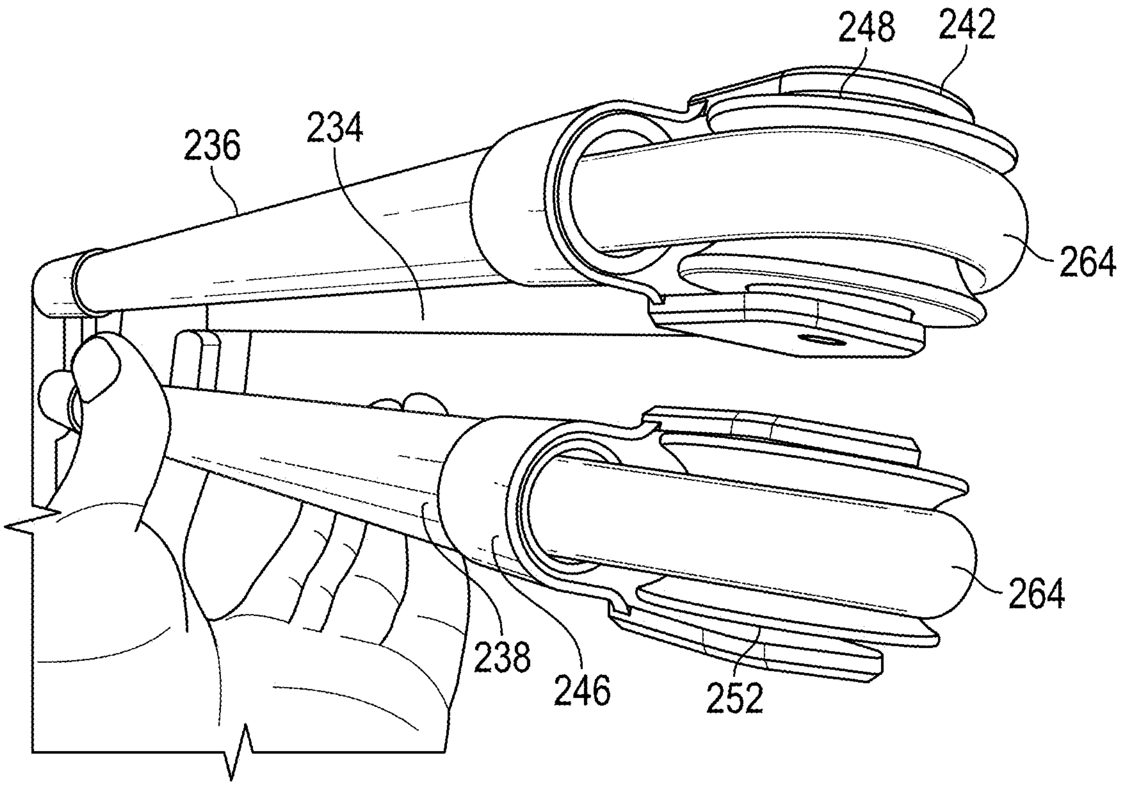

Here, second connector 242 positions horizontally such that second elongated tube 236 positions in parallel to first elongated tube 234, and second elongated tube 236 is offset to brackets 220 and first elongated tube 234, as shown in FIG. 15. Third connector 244 positions vertically down such that third elongated tube 238 positions below and in parallel to second elongated tube 236. Further, fourth connector 246 positions horizontally such that fourth elongated tube 240 positions in parallel to third elongated tube 238 and below first elongated tube 234, and aligns with brackets 220. FIG. 16 shows the horizontal connectors 242, 246 used for connecting elongated tubes 234, 236, 238 and 240 that present a gap between them. As specified above, fourth elongated tube 240 positions below first elongated tube 234. As such, fourth elongated tube 240 aligns with fourth return roller 228.

Further, second connector 242 includes a fifth return roller 248, third connector 244 includes a sixth return roller 250, and fourth connector 246 includes a seventh return roller 252. Here, fifth return roller 248 and seventh return roller 252 position horizontally and sixth return roller 250 positions vertically.

Figure 17:
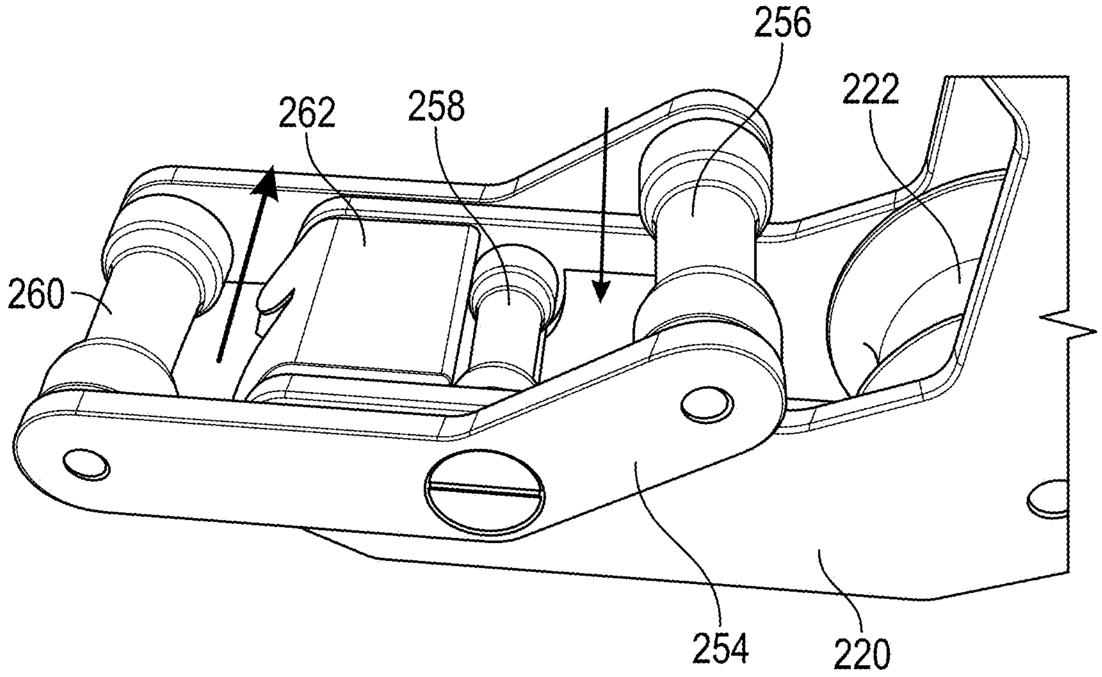
FIG. 17 illustrates a perspective view of retention arms, in accordance with one embodiment of the present invention.

Referring back to FIG. 14, brackets 220 present retention arms 254. Retention arms 254 pivotably connect at both sides of brackets 220. FIG. 17 shows an enlarged view of retention arms 254, in accordance with one embodiment of the present invention. In one example, each retention arm 254 is angled at about 15-25 degrees. Retention arms 254 are configured to operate between an engaged position and disengaged position. In one implementation, retention arms 254 include three rollers i.e., a first roller 256, a second roller 258, and a third roller 260. As can be seen, first roller 256 positions at distal ends of retention arms 254 and positions in proximity to first return roller 222 and below fourth return roller 228. Third roller 260 positions the other end of retention arms 254. Second roller 258 positions in between first roller 256 and third roller 260. In one example, second roller 258 positions closer to first roller 256 allowing sufficient space to place a cable locking member 262 in between second roller 258 and third roller 260. Cable locking member 262 includes all features and operates similar to cable locking member 70 explained above.

Further, system 202 includes a cable 264. Cable 264 indicates an elastic tension rope or resistance band or stretchy rope. Cable 264 may be filled with a fluid and includes a hollow inner diameter. This helps the cable 264 to not stick to itself and enables it to move freely over return rollers, elongated tubes and rollers, and reduces the internal friction. Cable 264 presents a cable first end 266 and a cable second end 268.

In the present embodiment, cable first end 266 is drawn into brackets 220. Here, cable first end 266 is drawn over and right of first return roller 222. Subsequently, cable first end 266 is drawn from bottom left of second return roller 224. Further, cable first end 266 is drawn up and over third return roller 226. At this point, cable first end 266 is drawn through first elongated tube 234. After existing from first elongated tube 234, cable first end 266 is positioned around fifth return roller 248 and drawn through second elongated tube 236. Subsequently, cable first end 266 is positioned around sixth return roller 250 and drawn through third elongated tube 238. Further, cable first end 266 is positioned around seventh return roller 252 and drawn through fourth elongated tube 240. As presented above, fourth elongated tube 240 is positioned to align with fourth return roller 228. As such, cable first end 266 is made to go over fourth return roller 228. Here, cable first end 266 is drawn down at an angle (straight/vertical angle (slanted position)) such that cable first end 266 is made to go over interfacing first roller 256, underneath second roller 258, pass through cable locking member 262, and over third roller 260.

Figure 18:
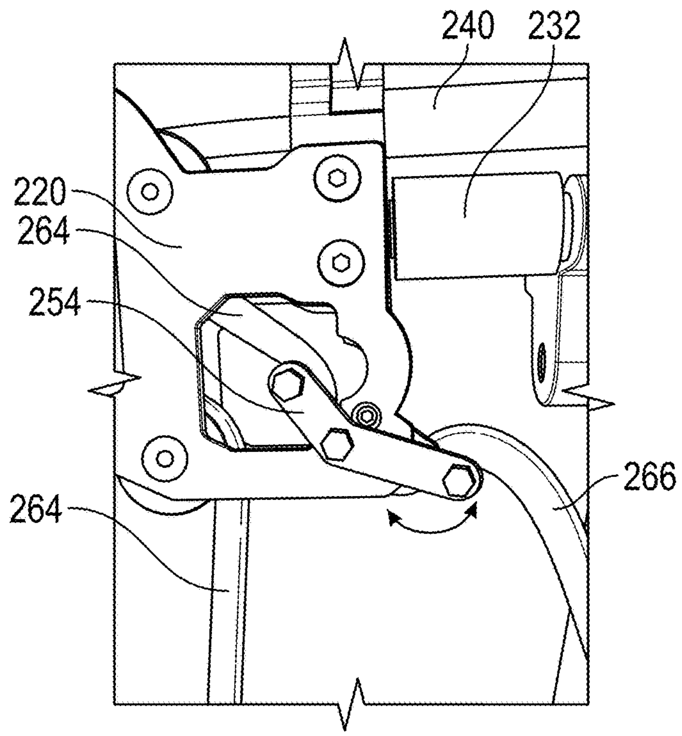
FIG. 18 and FIG. 19 illustrate the operation of the retention arms, in accordance with one embodiment of the present invention.
Figure 19:
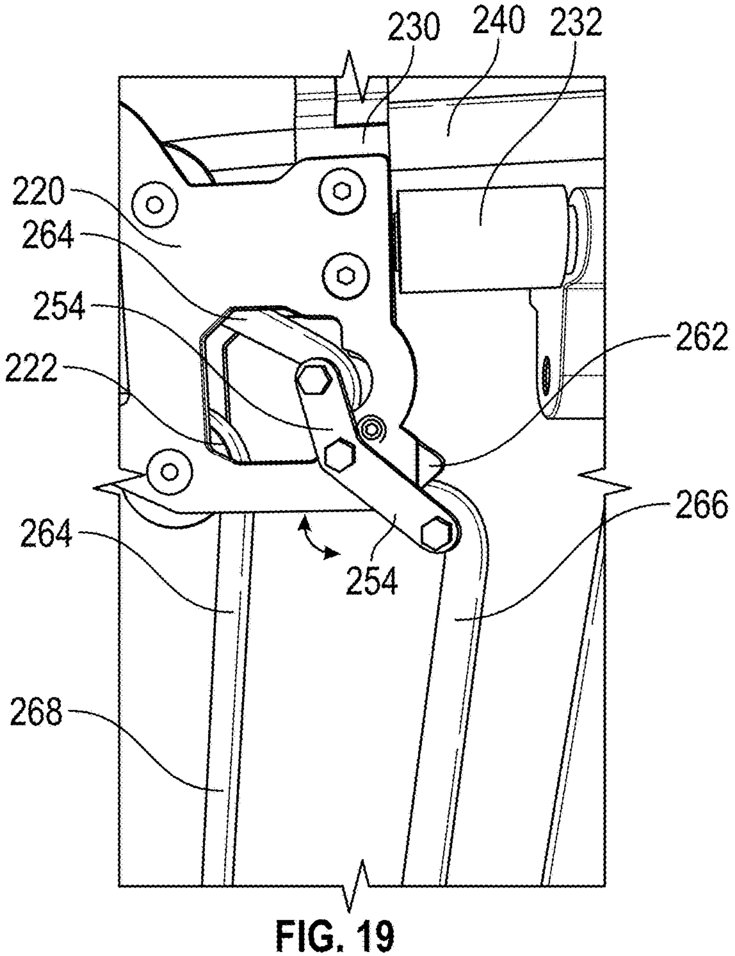

Now referring to FIG. 18 and FIG. 19, locking mechanism of cable 264 is explained. Camera operator 206 pulls out sufficient length of cable first end 266 (of cable 264) depending on the need. In some implementations, camera operator 206 holds cable first end 266 with his/her one hand. Cable second end 268 is used to connect to a load such as camera 204, as can be seen from FIG. 13. After connecting camera 204, camera operator 206 pulls down retention arms 254 to a disengaged position such that he/she will be able to pull cable first end 266, which in turn pulls up cable second end 268 and thereby camera 204. This mechanism can also be actuated while the camera is suspended from the device. This reduces down-time and allows quick adjustments on the set and between takes. The operator would keep one hand on the camera while the other hand adjusts the tension. When retention arms 254 are pulled down, cable first end 266 is prevented from engaging with the seesaw-like structure of cable locking member 262 thereby allowing cable 264 to move freely. During the disengaged position, cable 264 from fourth return roller 228 to first roller 256 has a straight/vertical angle (slanted position) allowing cable 264 to be easily pulled or released holding cable first end 266 (FIG. 19). Here, camera operator 206 can adjust the length of cable first end 266 freely by pulling or releasing cable 264 while positioning it straight/vertical angle (slanted position) from fourth return roller 228 to first roller 256.

After achieving desired length, the tension at cable 264 pushes up retention arms 254 such that it turns from the disengaged position to the engaged position as soon as camera operator 206 releases cable 264. Here, the straight angle (slanted position) of cable 264 from fourth return roller 228 to first roller 256 is constrained or offset by first roller 256 and prevents it from being pulled further (FIG. 18). The tighter camera operator 206 tries to pull down, the tighter retention arms 254 tries to lock the position of cable 264.

As cable first end 266 is locked, the tension remaining at cable 264 especially at cable second end 268 enables suspended camera 204 to move up and down even thereby assisting the operator holding the camera. This way, camera 204 remains stable when camera operator 206 moves or even jumps or walks or runs. In some implementations, camera operator 206 may hold camera 204 to control the direction it has to face to capture video while system 202 takes care of camera 204 being held in a stable position via pole 210 and system 202.

Figure 20:
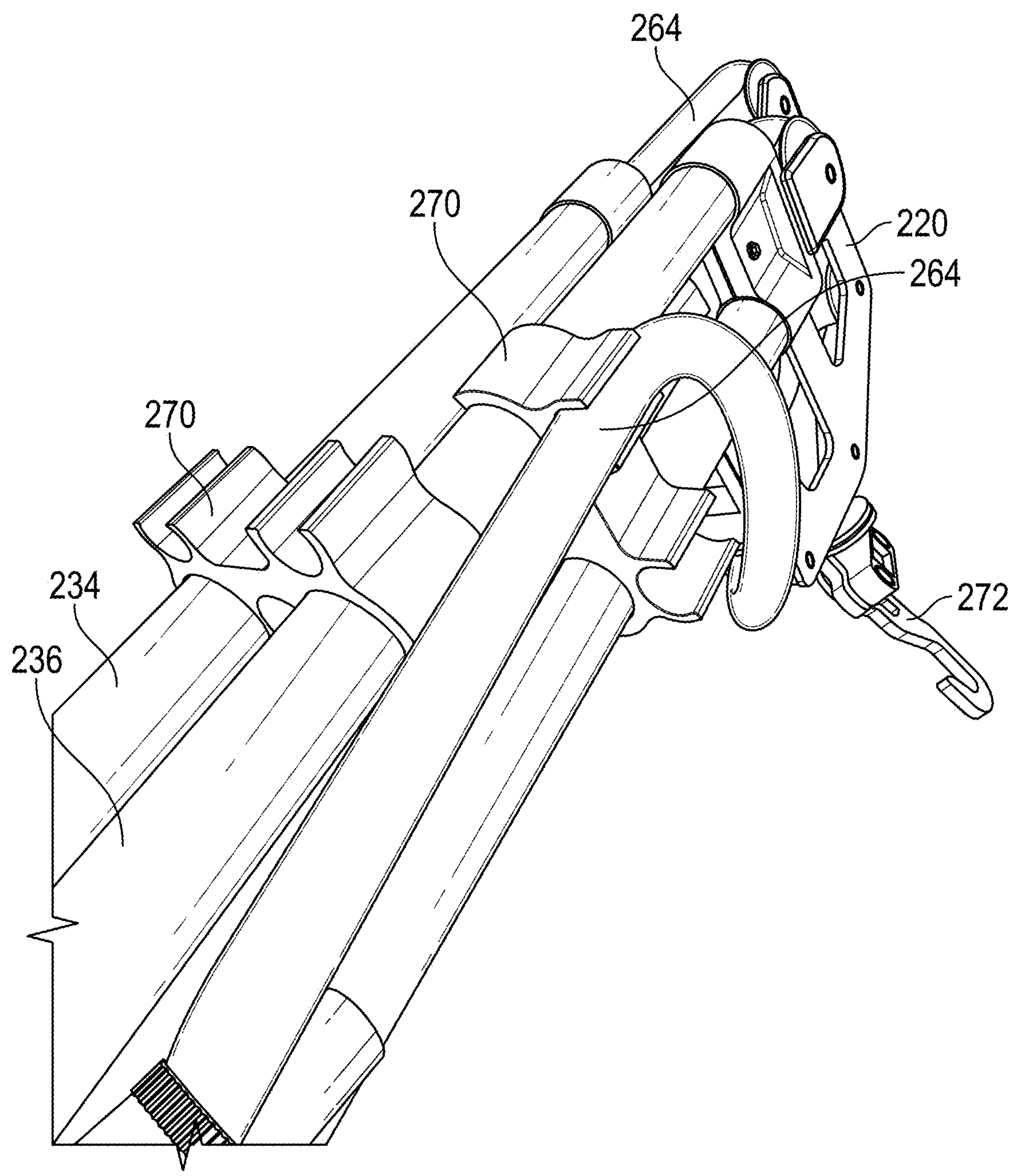
FIG. 20 illustrates the feature of clips connected to the load suspending system, in accordance with one embodiment of the present invention.

In one embodiment, system 202 includes a plurality of clips 270. Clip 270 includes all features and operates similar to clip 90, as explained above. Clips 270 can be connected to tubes 234, 236, 238, 240 in various ways to manage excess cable 264, as shown in FIG. 20. Optionally, system 202 may include a hook member 272 with a magnetic lock used for connecting camera 204. Other types of clips may be used without detracting from the spirit of the invention, such as the clip shown in FIG. 8 and FIG. 9.

It should be understood that system 12 and system 100 present a dual tube design offering a compact design while still giving the camera operator an impressive level of isolation and boom range. Optionally, an extended version of tubes may be provided, which can offer more elastic pre-load than the dual tube design. Further, system 202 features a quad tube (four tubes) i.e., twice the amount of elastic pre-load as a dual tube design, giving the camera operator a larger neutral zone and boom range. The quad tube is recommended for "Easy Rig" users and speed rail mounting. The camera operator may use any one system or combination of systems described above to mount and suspend one or more cameras from the pole. For example, two systems (stabilizers) can be used together to lift up to 65 lbs. The presently disclosed system can be added to "rig" for enhanced vertical isolation and extended boom range or mount one to the "Easy Rig" to isolate your movement and go from shoulder to waist in one smooth move. The presently disclosed system is a first of its kind modular bungee camera stabilizer that's cross compatible with a large variety of popular camera support vests as well as speed rail for hard mounts. Six tube and eight tube embodiments are possible as well. It is also possible to extend the length of the tubes for even greater performance at the expense of size and weight of the device.

The presently disclosed invention provides several advantages over prior art. The load suspending system utilizes elastic cables or bands running through rollers or pulleys for stability and motion control. The load suspending system incorporates a novel locking mechanism, relying on friction and a "clam cleat" (seesaw) design to secure the elastic without requiring traditional springs. The load suspending system integrates rollers and retention arms for smoother movement and alignment of the cable, ensuring minimal friction, as well as its self-contained nature where the tension is held within the system and does not rely on a body mounted vest to function. The operator can remove the device from a body mounted vest and attach it to the fixed structure, such as a 1.5 or 1.25 speed rail pipe, commonly used in the industry.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

Advantages Over Prior Art

The load suspending systems described herein may provide several advantages over conventional camera stabilization devices. In some aspects, the use of elastic cables or bands running through a series of rollers or pulleys may allow for smoother and more controlled vertical motion compared to rigid support arms. The elastic nature of the cable may absorb small vibrations and movements, potentially resulting in steadier camera operation. The lack of rigid/metal connection to the camera is also a benefit to reduce vibrations.

The novel locking mechanism utilizing friction and a "clam cleat" (seesaw) design to secure the elastic cable may offer benefits over traditional spring-based locking systems. This design may allow for more precise tension adjustment and potentially reduce wear on components over time. The seesaw structure with teeth may provide a secure grip on the cable while still allowing for quick release when needed.

In some implementations, the integration of multiple rollers and strategically positioned retention arms may contribute to smoother cable movement and improved alignment throughout the system. This configuration may help minimize friction and reduce the force required to adjust the camera position. The ability to easily transition between engaged and disengaged positions may allow operators to quickly make adjustments during filming.

The modular nature of the described systems may provide flexibility for different camera setups and operator preferences. The ability to use multiple stabilizers in combination or integrate with existing support structures like "Easy Rigs" may expand the versatility of the system for various filming scenarios.

In some cases, the load suspending systems may offer improved ergonomics for camera operators. By passively supporting the weight of the camera and allowing for smooth vertical adjustments, the systems may reduce operator fatigue during extended shooting sessions. This may be particularly beneficial for situations requiring frequent repositioning or following of moving subjects. The lack of such loading on the camera operator due to the stabilization and elastic characteristics are also beneficial. Rigging strings in the "Easy Rig" do not provide this effect.

The use of hollow, fluid-filled elastic cables may provide unique performance characteristics. These cables may offer reduced internal friction and reduced self-adhesion properties, potentially contributing to smoother operation and increased durability and lower noise. In addition, the surface of the rollers, which may be made from plastic, and where the elastic rides, may be on a bead blasted/texturized material to eliminate squeaking noises from the elastic rubbing on plastic.

In certain aspects, the load suspending systems may allow for a wider range of vertical motion compared to some conventional stabilizers. The ability to smoothly transition from shoulder height to waist level in a single movement may expand creative shot possibilities for filmmakers.

DEFINITIONS

As used herein, the term "load suspending system" may refer to an apparatus designed to support and stabilize a payload, such as a camera or other equipment, while allowing controlled vertical movement.

The term "elastic member" or "cable" may refer to a flexible, stretchable component capable of elongation and contraction, which may be used to provide tension and support within the load suspending system.

"Return rollers" may refer to rotatable elements around which the elastic member is guided, facilitating smooth movement and redirection of the elastic member within the system.

"Retention arms" may refer to pivotable components of the load suspending system that can engage or disengage to control the position and tension of the elastic member.

The term "cable locking member" may refer to a mechanism designed to secure the position of the elastic member, often utilizing friction or mechanical interference to maintain tension.

"Elongated tubes" may refer to hollow cylindrical components through which the elastic member is routed, providing guidance and support for the elastic member's path through the system.

The term "engaged position" may refer to the state of the retention arms or locking mechanism when actively securing the elastic member in place.

Conversely, "disengaged position" may refer to the state of the retention arms or locking mechanism when allowing free movement of the elastic member.

The term "payload" or "load" may refer to the equipment, typically a camera or filming device, that is supported and stabilized by the load suspending system.

"Brackets" may refer to structural components of the load suspending system that provide support and mounting points for other elements of the system.

As used herein, the term "harness" may refer to a wearable support structure designed to distribute the weight of the load suspending system and camera equipment across the operator's body.

The term "support pole" or "rig" may refer to an extended structural component that connects the harness to the load suspending system, providing a mounting point above and behind the camera operator.

"Clip" may refer to a detachable fastening device used to secure excess cable length or attach accessories to the load suspending system.

The term "neutral zone" may refer to a range of motion within which the load suspending system maintains relatively constant tension on the payload.

"Boom range" may refer to the vertical distance through which the camera or payload can be smoothly moved using the load suspending system.

"Easy Rig" may refer to a specific type of body-mounted camera support system that can be used in conjunction with or as an alternative to the load suspending systems described herein.

The term "speed rail" may refer to a type of modular support structure commonly used in film and television production, which can be adapted to mount the load suspending system.

"Bungee" may refer to an elastic cord or cable used to provide tension and support within the load suspending system.

The term "clam cleat" may refer to a type of friction-based locking mechanism used to secure a rope or cable, often featuring a wedge-shaped channel with serrated edges.

"Modular" may refer to a design approach where components of the load suspending system can be easily interchanged, added, or removed to suit different configurations or applications.

ELEMENTS AND REFERENCE NUMBERS

10 load suspending system
12 suspension assembly
14 camera
16 camera operator
18 body harness
20 support pole
30 bracket
32 first bracket section
34 second bracket section
36 first connector
38 pole connector
40 first return roller
42 second return roller

44 third return roller
46 fourth return roller
48 first pin
50 first elongated tube
52 second elongated tube
54 second connector
56 fifth return roller
58 second pin
60 retention arm
62 first roller
64 second roller
66 third roller
68 bearing
70 cable locking member
72 flat surface
74 seesaw structure
80 elastic member
82 first end
84 second end
90 storage clip
92 claw member
94 u-shaped member
96 hook member
100 load suspending system
102 mounting bracket
104 frame section
106 pivot point
108 support arm
110 roller mount
112 roller assembly
114 first bracket
116 locking mechanism
118 elongated tube
120 tube section
122 end connector
124 roller mount
126 retention arm
128 first roller
130 second roller
132 third roller
134 locking member
136 elastic member
138 first end
140 second end
200 suspension system environment
202 suspension system
204 suspended camera
206 camera operator
208 support harness
210 support pole
220 frame brackets
222 first return roller
224 second return roller
226 third return roller
228 fourth return roller
230 first connector
232 pole connector
234 first elongated tube
236 second elongated tube
238 third elongated tube
240 fourth elongated tube
242 second connector
244 third connector
246 fourth connector
248 fifth return roller
250 sixth return roller
252 seventh return roller
254 retention arms
256 first roller
258 second roller
260 third roller
262 cable locking member
264 elastic cable
266 cable first end
268 cable second end
270 cable clips
272 magnetic hook

CLAUSES

1. A load suspending system, comprising: brackets; elongated tubes extending from said brackets; a plurality of return rollers positioned at said brackets and said elongated tubes; an elastic member having a first end and a second end, wherein said elastic member is drawn via said return rollers and said elongated tubes, and wherein said second end is configured to suspend a load; and retention arms pivotably connected to said brackets, wherein said retention arms are configured to lock in a position of said elastic member to maintain tension at said second end.

2. The load suspending system of clause 1, wherein said plurality of return rollers comprise a first return roller, a second return roller, a third return roller, a fourth return roller and a fifth return roller arranged to define an elastic member path.

3. The load suspending system of clause 1, wherein said elongated tubes comprise at least two elongated tubes.

4. The load suspending system of clause 1, wherein said elongated tubes are positioned to align with return rollers of said plurality of return rollers.

5. The load suspending system of clause 2, wherein said first return roller, said second return roller, said third return roller, and said fourth return roller are positioned in said brackets.

6. The load suspending system of clause 5, wherein said fifth return roller interfaces with said elongated tubes.

7. The load suspending system of clause 2, wherein said elongated tubes comprise at least four elongated tubes, wherein said load suspending system further comprises a sixth return roller and a seventh return roller, and wherein said fifth return roller, said sixth return roller and said seventh return roller interface with said elongated tubes.

8. The load suspending system of clause 1, wherein said retention arms comprise rollers and a cable locking member to lock in the position of said elastic member.

9. The load suspending system of clause 8, wherein said rollers comprise a first roller, a second roller, and a third roller, wherein said cable locking member positions between said second roller and said third roller, and wherein said elastic member goes over said first roller, underneath said second roller, passes through said cable locking member, and goes over said third roller.

10. The load suspending system of clause 8, wherein said cable locking member comprises a seesaw-like structure having teeth configured to constrict the movement of said elastic member.

11. The load suspending system of clause 8, wherein said retention arms are configured to transition from a disengaged position to an engaged position in response to the tension in said elastic member.

12. The load suspending system of clause 1, further comprises a clip, wherein said clip removably connects to an elongated tube of said elongated tubes, and wherein said clip stores excess length of said elastic member.

13. The load suspending system of clause 1, wherein said load suspending system stabilizes said load suspending at said second end during movements of a user, said movements including walking, running or jumping.

14. A load suspending system, comprising: brackets; elongated tubes extending from said brackets; a plurality of return rollers positioned at said brackets and said elongated tubes; an elastic member having a first end and a second end, wherein said elastic member is drawn via said return rollers and said elongated tubes, and wherein said second end is configured to suspend a load; and retention arms pivotably connected to said brackets, wherein said retention arms comprise rollers and a cable locking member, and wherein said retention arms are configured to lock in the position of said elastic member to maintain tension at said second end.

15. The load suspending system of clause 14, wherein said plurality of return rollers comprise a first return roller, a second return roller, a third return roller, a fourth return roller and a fifth return roller arranged to define an elastic member path.

16. The load suspending system of clause 14, wherein said elongated tubes comprises at least two elongated tubes, and wherein said elongated tubes are positioned to align with return rollers of said plurality of return rollers.

17. The load suspending system of clause 14, wherein said rollers comprise a first roller, a second roller, and a third roller, wherein said cable locking member positions between said second roller and said third roller, and wherein said elastic member goes over said first roller, underneath said second roller, passes through said cable locking member, and goes over said third roller.

18. The load suspending system of clause 17, wherein said cable locking member comprises a seesaw-like structure having teeth configured to constrict the movement of said elastic member.

19. A method of providing a load suspending system, said method comprising the steps of: providing brackets; providing elongated tubes extending from said brackets; providing a plurality of return rollers positioned at said brackets and said elongated tubes; providing an elastic member having a first end and a second end, said elastic member drawn via said return rollers and said elongated tubes, said second end being configured to suspend a load; providing retention arms pivotably connected to said brackets; and locking in a position of said elastic member to maintain tension at said second end using said retention arms.

20. The method of clause 19, further comprising providing rollers and a cable locking member at said retention arms to lock in the position of said elastic member, said rollers comprising a first roller, a second roller, and a third roller, said cable locking member positioning between said second roller and said third roller, said elastic member going over said first roller, underneath said second roller, passing through said cable locking member, and going over said third roller.

What is claimed is:

1. A load suspending system, comprising:

brackets;

elongated tubes extending from said brackets;

a plurality of return rollers positioned at said brackets and said elongated tubes;

an elastic member having a first end and a second end, wherein said elastic member is drawn via said return rollers and said elongated tubes, and wherein said second end is configured to suspend a load; and retention arms pivotably connected to said brackets, wherein said retention arms are configured to lock in a position of said elastic member to maintain tension at said second end.

2. The load suspending system of claim 1, wherein said plurality of return rollers comprise a first return roller, a second return roller, a third return roller, a fourth return roller and a fifth return roller arranged to define an elastic member path.

3. The load suspending system of claim 1, wherein said elongated tubes comprise at least two elongated tubes.

4. The load suspending system of claim 1, wherein said elongated tubes are positioned to align with return rollers of said plurality of return rollers.

5. The load suspending system of claim 2, wherein said first return roller, said second return roller, said third return roller, and said fourth return roller are positioned in said brackets.

6. The load suspending system of claim 5, wherein said fifth return roller interfaces with said elongated tubes.

7. The load suspending system of claim 2, wherein said elongated tubes comprise at least four elongated tubes, wherein said load suspending system further comprises a sixth return roller and a seventh return roller, and wherein said fifth return roller, said sixth return roller and said seventh return roller interface with said elongated tubes.

8. The load suspending system of claim 1, wherein said retention arms comprise rollers and a cable locking member to lock in the position of said elastic member.

9. The load suspending system of claim 8, wherein said rollers comprise a first roller, a second roller, and a third roller, wherein said cable locking member positions between said second roller and said third roller, and wherein said elastic member goes over said first roller, underneath said second roller, passes through said cable locking member, and goes over said third roller.

10. The load suspending system of claim 8, wherein said cable locking member comprises a seesaw-like structure having teeth configured to constrict the movement of said elastic member.

11. The load suspending system of claim 8, wherein said retention arms are configured to transition from a disengaged position to an engaged position in response to the tension in said elastic member.

12. The load suspending system of claim 1, further comprises a clip, wherein said clip removably connects to an elongated tube of said elongated tubes, and wherein said clip stores excess length of said elastic member.

13. The load suspending system of claim 1, wherein said load suspending system stabilizes said load suspending at said second end during movements of a user, said movements including walking, running or jumping.

14. A load suspending system, comprising:

brackets;

elongated tubes extending from said brackets;

a plurality of return rollers positioned at said brackets and said elongated tubes;

an elastic member having a first end and a second end, wherein said elastic member is drawn via said return rollers and said elongated tubes, and wherein said second end is configured to suspend a load; and retention arms pivotably connected to said brackets, wherein said retention arms comprise rollers and a cable locking member, and wherein said retention arms are configured to lock in a position of said elastic member to maintain tension at said second end.

15. The load suspending system of claim 14, wherein said plurality of return rollers comprise a first return roller, a second return roller, a third return roller, a fourth return roller and a fifth return roller arranged to define an elastic member path.

16. The load suspending system of claim 14, wherein said elongated tubes comprises at least two elongated tubes, and wherein said elongated tubes are positioned to align with return rollers of said plurality of return rollers.

17. The load suspending system of claim 14, wherein said rollers comprise a first roller, a second roller, and a third roller, wherein said cable locking member positions between said second roller and said third roller, and wherein said elastic member goes over said first roller, underneath said second roller, passes through said cable locking member, and goes over said third roller.

18. The load suspending system of claim 17, wherein said cable locking member comprises a seesaw-like structure having teeth configured to constrict the movement of said elastic member.

19. A method of providing a load suspending system, said method comprising the steps of:

providing brackets;

providing elongated tubes extending from said brackets;

providing a plurality of return rollers positioned at said brackets and said elongated tubes;

providing an elastic member having a first end and a second end, said elastic member drawn via said return rollers and said elongated tubes, said second end being configured to suspend a load;

providing retention arms pivotably connected to said brackets; and locking in a position of said elastic member to maintain tension at said second end using said retention arms.

20. The method of claim 19, further comprising providing rollers and a cable locking member at said retention arms to lock in the position of said elastic member, said rollers comprising a first roller, a second roller, and a third roller, said cable locking member positioning between said second roller and said third roller, said elastic member going over said first roller, underneath said second roller, passing through said cable locking member, and going over said third roller.

* * * * *